United States Patent [19]

Umeno et al.

[11] Patent Number: 4,554,780
[45] Date of Patent: Nov. 26, 1985

[54] POWER TRANSMISSION APPARATUS IN MOBILE TYPE LAWN MOWER

[75] Inventors: Hiroshi Umeno, Higashikurume; Gunji Saito, Tokorozawa; Morimasa Hayashida, Kodaira, all of Japan

[73] Assignee: Honda Giken Kogyo Kabushiki Kaisha, Tokyo, Japan

[21] Appl. No.: 543,731

[22] Filed: Oct. 20, 1983

[30] Foreign Application Priority Data

Oct. 20, 1982 [JP] Japan .......................... 57-157488[U]

[51] Int. Cl.$^4$ ............................................. A01D 53/00
[52] U.S. Cl. ...................................... 56/11.8; 56/17.2
[58] Field of Search .................. 56/11.8, 17.2; 180/19, 180/59, 61, 63; 280/43, 43.17

[56] References Cited

U.S. PATENT DOCUMENTS

| 1,907,005 | 5/1933 | Risser | 280/43.17 |
| 2,475,716 | 7/1949 | Nabors | 56/17.2 |
| 2,818,270 | 12/1957 | Cataline | 280/43.17 |
| 3,411,275 | 11/1968 | Mattson et al. | 56/11.8 |
| 4,212,364 | 7/1980 | Dobberpahl | 280/43 |

Primary Examiner—Gene Mancene
Assistant Examiner—David L. Tarnoff
Attorney, Agent, or Firm—Armstrong, Nikaido, Marmelstein & Kobovcik

[57] ABSTRACT

The present invention is directed to a power transmission apparatus for a power driven lawn mower. The lawn mower has a housing, an engine mounted on the housing, a moving blade coupled to the engine and wheels which are swingably mounted on the housing. The swinging of the wheels moves the housing towards and way from the ground in order to raise and lower the housing to thereby raise and lower the lawn mower blade. The power transmission apparatus comprises a transmission mechanism and a transmission chamber for housing the transmission mchanism, the chamber including a guide structure. The transmission mechanism includes a drive shaft coupled to the engine and a single reduction gear mechanism coupled to the drive shaft and the wheels for transmitting the rotation of the drive shaft to the wheels. The reduction gear mechanism includes an engaging structure for engaging the guide structure in the chamber wherein the swinging movement of the wheels causes a corresponding movement of the reduction gear mechanism. The corresponding movement of the reduction gear mechanism is guided by the movement of the engaging structure in the guide structure.

9 Claims, 4 Drawing Figures

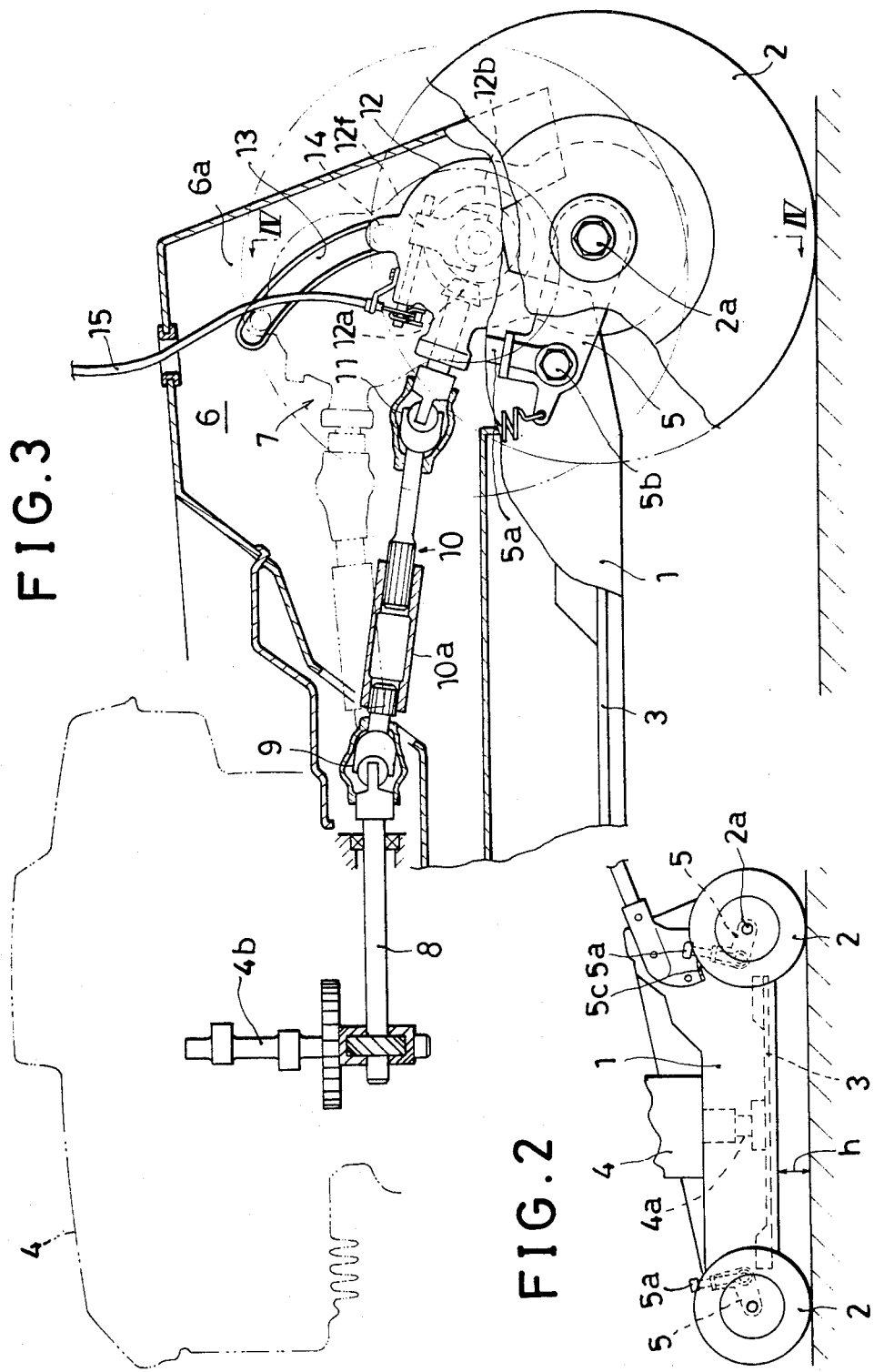

POWER TRANSMISSION APPARATUS IN MOBILE TYPE LAWN MOWER

BACKGROUND OF THE INVENTION

1. Field of the Invention

This invention relates to a power transmission apparatus in a mobile type lawn mower, and more particularly, to a power transmission apparatus in a mobile type lawn mower with at least one wheel mounted through a swingable arm on a housing which contains a mowing blade. The wheel is movable upwards and downwards for adjustment and is driven, through a power transmission mechanism in a power transmission chamber formed on the housing, by a power source mounted on an upper surface of the housing.

2. Description of the Prior Art

It has been usual in power driven lawn mowers that the power transmission mechanism includes a first reduction gear means between an output shaft at an upper position of the interior of the power transmission chamber and an intermediate shaft below the input shaft and pivotally supporting the swingable arm; a second reduction gear means of a swingable type between the intermediate shaft and a wheel axle supported on the swingable arm; and an output shaft connected to the power source through a power transmission member such as a belt, a chain or the like which is provided above the mowing blade wheel located below the power source.

This type of transmission is inconvenient in that the construction thereof is complicated, because it has the two reduction gear means.

SUMMARY OF THE INVENTION

It is an object of the present invention to provide a power transmission mechanism for a lawn mower which has swingable wheels for adjusting the height of the lawn mower and which includes only a single reduction gear mechanism.

It is another object of the present invention to provide a gear transmission mechanism for a power driven lawn mower with swingable wheels for raising and lowering the height of the lawn mower in which the movement of the reduction gear mechanism within the transmission chamber is guided in order to minimize the size of the transmission chamber.

It is still another object of the present invention to provide a power transmission mechanism for a power driven lawn mower in which the power transmission mechanism includes a shaft of varying length which enables a gear reduction mechanism to be moved within the transmission housing upon the swinging of the wheels to raise and lower the lawn mower.

The present invention is directed to a power transmission apparatus for a power driven lawn mower. The lawn mower has a housing, an engine mounted on the housing, a moving blade coupled to the engine and wheels which are swingably mounted on the housing. The swinging of the wheels moves the housing towards and away from the ground in order to raise and lower the housing to thereby raise and lower the lawn mower blade. The power transmission apparatus comprises a transmission mechanism and a transmission chamber for housing the transmission mechanism, the chamber including a guide structure. The transmission mechanism includes a drive shaft coupled to the engine and a single reduction gear mechanism coupled to the drive shaft and the wheels for transmitting the rotation of the drive shaft to the wheels. The reduction gear mechanism includes an engaging structure for engaging the guide structure in the chamber wherein the swinging movement of the wheels causes a corresponding movement of the reduction gear mechanism. The corresponding movement of the reduction gear mechanism is guided by the movement of the engaging structure in the guide structure.

BRIEF DESCRIPTION OF THE DRAWINGS

FIG. 2 is a side view of the preferred embodiment of the present invention.

FIG. 3 is a partial sectional side view thereof.

DETAILED DESCRIPTION OF THE PREFERRED EMBODIMENT

Figure 1:
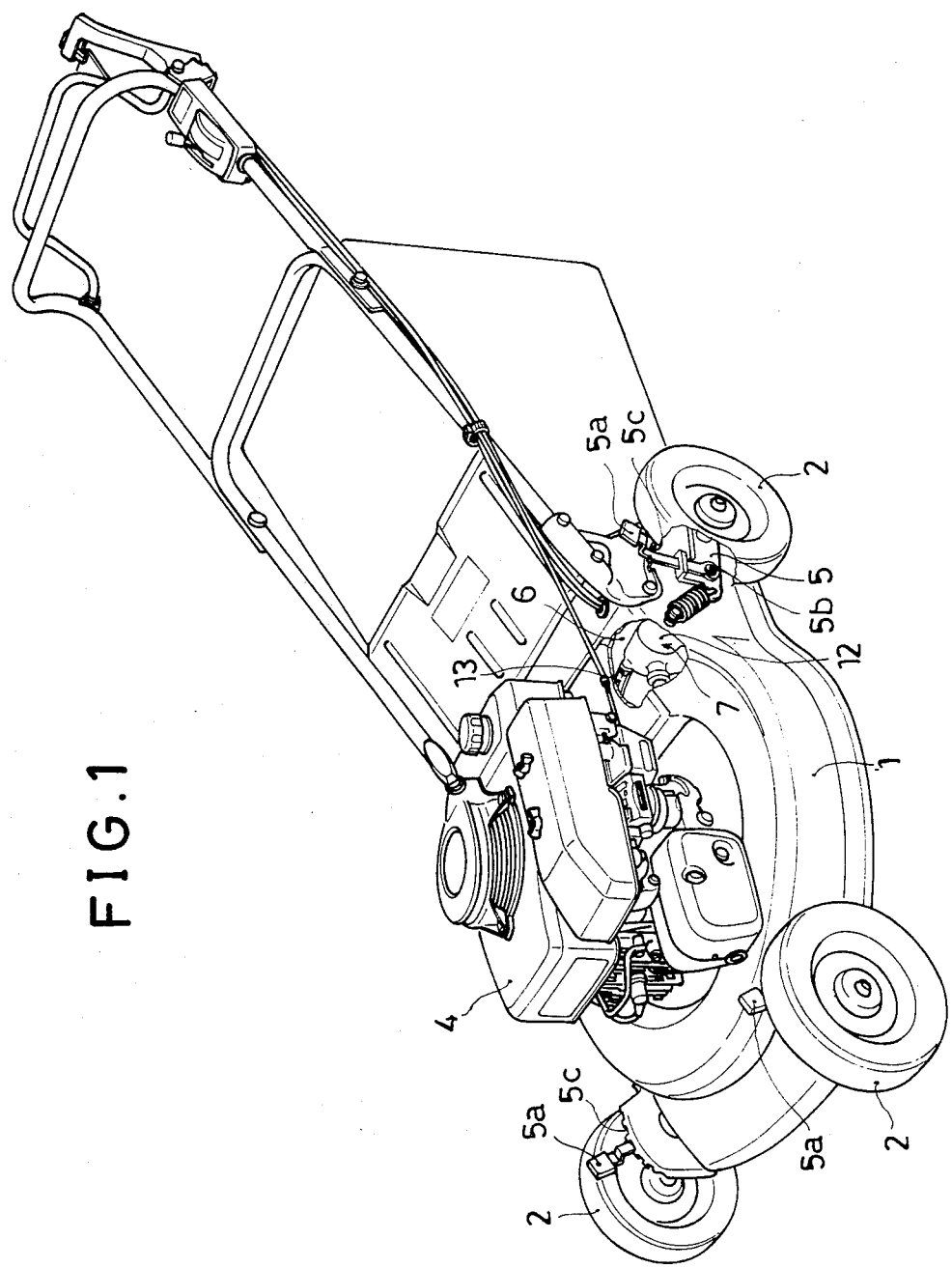
FIG. 1 is a perspective view, partly in section, of a lawn mower having an apparatus according to the present invention.

Referring to the drawings, a housing 1 of a lawn mower has a pair of right and left front wheels 2, 2; a pair of right and left rear wheels 2, 2; and a mowing blade 3 contained in the housing 1 as shown in FIG. 2. The mowing blade is connected to a crankshaft 4a of an internal combustion engine 4, which is mounted on an upper surface of the housing 1 so that the blade 3 is rotated by the engine 4. Each of the four wheels 2 is mounted on the housing 1 through a swingable arm 5 having an operation lever 5a for upward and downward adjustment. The height h of the housing 1 from the ground may thus be adjusted by the upward and downward movement of each wheel 2 and accordingly, the height of mowing may be adjusted. Additionally, the rear wheels 2, 2 are coupled to the engine 4 through a power transmission mechanism 7 housed in a power transmission chamber 6 formed on one side of a rear space portion of the housing 1. A pivot shaft 5b is connected to the swingable arm 5 and a positioning guide 5c engages and positions the operation lever 5a.

Figure 4:
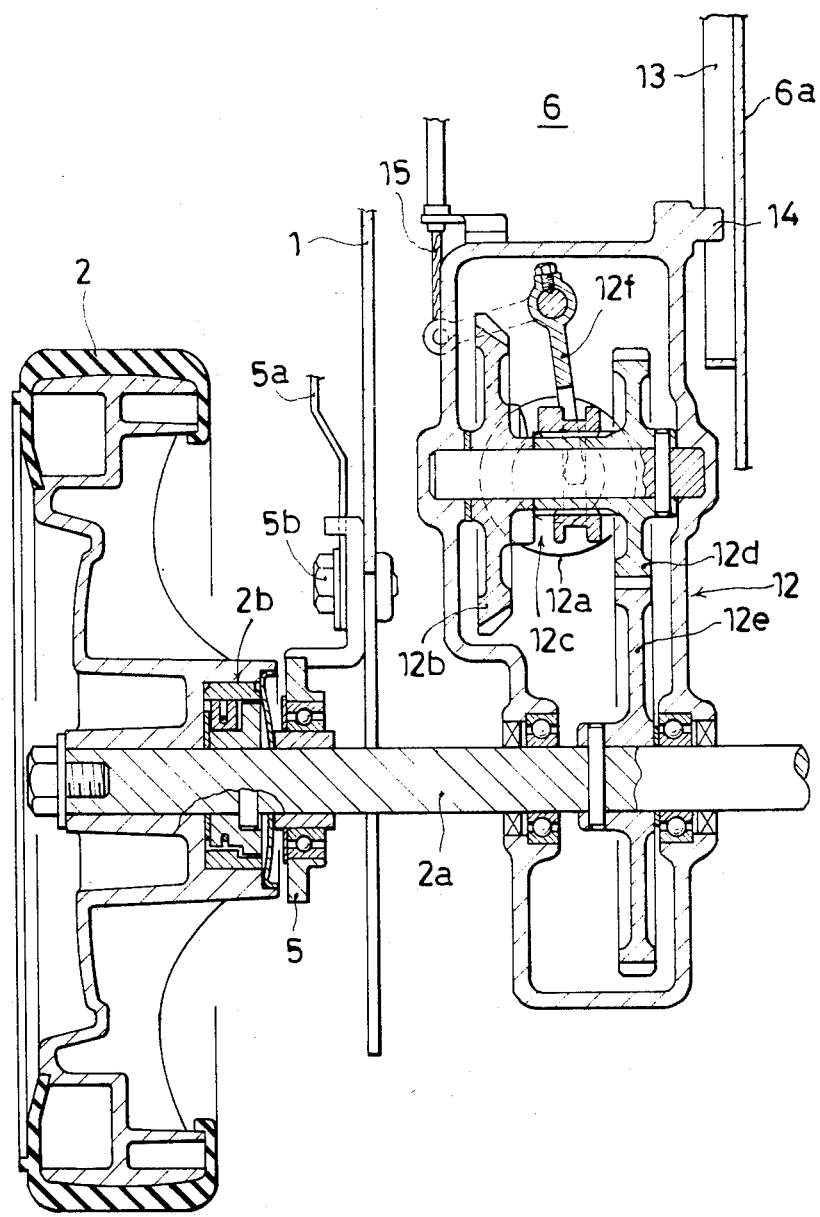
FIG. 4 is a sectional view taken along the line IV—IV in FIG. 3.

The power transmission mechanism 7 comprises a driving shaft 10 connected through a universal joint 9 to an output shaft 8 of the engine 4. A reduction gear means 12 is connected through a universal joint 11 to the driving shaft 10, and the driving shaft 10 is expandable and contractable in its axial direction by means of an intermediate spline sleeve 10a. The reduction gear means 12 is supported on the swingable arm 5 through its output shaft comprising a wheel axle 2a of the rear wheel 2, as shown clearly in FIG. 4, and in addition, the reduction gear means 12 is arranged so that, in conjunction with a swing movement of the swingable arm 5, the gear means 12 in its casing is movable along a guide portion 13 in the power transmission chamber 6. A one-way clutch 2b is interposed between the rear wheel 2 and the wheel axle 2a.

The output shaft 8 extends forward from the power transmission chamber 6 into engagement with a cam shaft 4b of the side valve type engine 4. The casing for the reduction gear means 12 is in slidable engagement, at a guide pin 14 extending laterally from a top portion of the casing, with the guide portion 13, which is in the form of an upwardly and forwardly extended arc groove formed on a side wall 6a of the power transmission chamber 6.

The reduction gear means 12 is provided, in its casing, with an input side bevel gear 12b that meshes with a pinion 12a on an output end portion of the universal joint 11. An intermediate gear 12d is connected to the bevel gear 12b through a dog clutch 12c, and an output side gear 12e meshes with the intermediate gear 12d. The clutch 12c is changeable between ON and OFF by a shift fork 12f operable by a cable 15 for enabling the lawn mower to run or stop.

If each of the swingable arms 5 for the front and rear wheel 2 are moved to swing upwards for elevating the wheels 2 to decrease the height h of the housing 1 from the ground, the reduction gear means 12 is also elevated through the wheel axle 2a carried by the arm 5. In this case, the reduction gear means 12 is moved in a forward inclined posture along the guide portion 13, while pushing and contracting the driving shaft 10 as shown by dotted lines in FIG. 3. The resulting advantage is that even if a rear wall 6a of the power transmission chamber 6 is forwardly inclined in order to decrease the size of the housing 1, the reduction gear means 12 does not abut the rear wall 6a. In other words, the reduction gear means 12 can be moved freely because the driving shaft 10 is constructed to be expandable and contractable. Additionally, the shape of the guide portion 13 is properly designed in shape, so it becomes possible to move reduction gear means 12 without being brought into contact with any portion of the walls of the power transmission chamber 6.

Even at any position of the movement of the reduction gear means 12, the power from the engine 4 can be transmitted through the driving shaft 10 and the reduction gear means 12 to the rear wheels 2.

Thus, according to the present invention, the swingable type second reduction gear means of the conventional apparatus is eliminated and power transmission to a rear wheel is carried out through a single reduction gear means coupled to the driving shaft. The apparatus can thus, be simplified in construction, and additionally the drive shaft is expandable and contractable, and the moving locus of the reduction gear means in conjunction with a swing movement of the swingable arm can be formed into any desired locus by properly changing the shape of a guide portion provided on a power transmission chamber. The transmission chamber is thus, made small-sized, and even with a small-size, it is possible to move the reduction gear means without the gear means contacting the chamber walls.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A power transmission apparatus for a power driven lawn mower, said mower having a housing, an engine mounted upon said housing, a mowing blade coupled to said engine, and wheel means comprising a shaft and a pair of wheels mounted on said shaft, said wheel means being swingably mounted on said housing, whereby the swinging of the wheel means adjusts the distance of said housing from the surface on which the wheels rest, said power transmission apparatus comprising:
    (a) a power transmission chamber formed on one side of a portion of said housing, having a guide means in the form of an arcuate groove integral with a side portion of said transmission chamber;
    (b) a transmission mechanism comprising an input shaft means coupled to said engine, a first gear means coupled to said input shaft, and a second gear means coupled to said first gear means and to said shaft of said wheel means;
    (c) a reduction gear means casing for housing said transmission mechanism, said casing comprising an upper portion containing said first gear means and receiving said input shaft, a lower portion containing said second gear means and receiving said shaft of said wheel means, and a guide pin extending laterally from said top portion and engagable in said guide means; and
    (d) a driving shaft means, connectable to said input shaft of said transmission at one end and to a rotatable output means of said engine at the opposite end, having means for accommodating changes in the distance between said engine and said input shaft.

2. The power transmission apparatus according to claim 1, wherein said arcuate groove is formed such that its lowest point is located further from the longitudinal center line of the housing than is it highest point and its center is closer to the longitudinal center line than is its lowest point.

3. The power transmission assembly according to claim 1, which also includes a clutching mechanism between said input shaft and said shaft of said wheel means.

4. A power transmission apparatus as set forth in claim 1, wherein the length of said drive shaft means is being varied in response to the movement of said reduction gear means causing corresponding to the swinging movement of said wheel means.

5. A power transmission apparatus as set forth in claim 4, wherein said drive shaft means includes a sleeve and a shaft slidable in said sleeve.

6. A power transmission apparatus as set forth in claim 5, wherein said shaft is splined in said sleeve.

7. A power transmission apparatus as set forth in claim 4, wherein said drive shaft means includes a first universal joint coupling said drive shaft means to said engine and a second universal joint coupling said drive shaft means to said reduction gear means.

8. A power transmission apparatus as set forth in claim 1, wherein said guide means is curved upwardly and forward with respect to said housing.

9. A power transmission apparatus as set forth in claim 1, wherein said wheel means includes swingable lever means coupling said shaft to said housing wherein the swinging movement of said lever means with respect to said housing causes the upward and downward movement of said wheels with respect to said housing.

* * * * *